United States Patent [19]

Nagase et al.

[11] 3,913,392

[45] Oct. 21, 1975

[54] PHYSICAL QUANTITY DETECTING CIRCUIT

[75] Inventors: Hiroshi Nagase, Nagoya; Hitoshi Ban, Ohbu, both of Japan

[73] Assignee: Kabushiki Kaisha Toyota Chuo Kenkyusho, Japan

[22] Filed: Mar. 12, 1974

[21] Appl. No.: 450,285

[30] Foreign Application Priority Data
Mar. 15, 1973 Japan................................ 48-30344
Mar. 15, 1973 Japan................................ 48-30345

[52] U.S. Cl.............................. 73/88.5 SD; 324/105
[51] Int. Cl.²...................... G01B 7/18; G01R 17/14
[58] Field of Search.................. 73/88.5 R, 88.5 SD; 324/105; 323/75 N, 68, 69

[56] References Cited
UNITED STATES PATENTS 3,495,159   2/1970   Smith............................... 324/105 X
3,634,757   1/1972   Monomakhoff................. 324/105 X
3,808,469   4/1974   Raymond.......................... 323/68 X Primary Examiner—Charles A. Ruehl
Attorney, Agent, or Firm—Oblon, Fisher, Spivak, McClelland & Maier

[57] ABSTRACT

A circuit for detecting a physical quantity has a detecting circuit including at least one semiconductor sensitive element, two input terminals and two output terminals, said semiconductor sensitive element has a resistivity which is variable in proportion to a physical quantity to be applied thereto, first power supply means connected to said two input terminals of said detecting circuit for applying a voltage thereacross, transistor means having an emitter, a base and a collector connected to one input terminal of said detecting circuit, said transistor means being disposed at a portion adjacent to said semiconductor sensitive element of said detecting circuit, second power supply means for applying a predetermined voltage to said base of said transistor means, and first resistor means having a predetermined resistance value connected to said first power supply means and said emitter of said transistor means.

Accordingly, the shift of sensitivity of said detecting circuit due to a temperature change of said semiconductor sensitive element is compensated by the characteristics of the voltage change between the base and emitter of said transistor means in proportion to the change of the temperature, thereby an output voltage is generated between said two output terminals precisely in proportion to the physical quantity to be applied to said semiconductor sensitive element.

Further improvements are disclosed eliminating the second power supply by using a biasing circuit, providing an impedance converter means to supply a voltage signal in proportion to a change in temperature at the input terminal of the detecting circuit, and providing negative feedback to increase the accuracy of detecting the physical quantity by controlling the output current to the detecting circuit.

21 Claims, 7 Drawing Figures

PHYSICAL QUANTITY DETECTING CIRCUIT

BACKGROUND OF THE INVENTION

1. Field of the Invention

The present invention relates to a physical quantity detecting circuit in which the thermal sensitivity shift of semiconductor transducers caused by a temperature change is compensated by supplying current or voltage provided with an appropriate positive temperature characteristic by utilizing the temperature characteristics of a transistor to a bridge circuit composed of semiconductor strain gauge elements.

2. Description of the Prior Art

The gauge factor of semiconductor strain gauge elements generally shows a negative temperature characteristic, so that the sensitivity of transducers composed of semiconductor strain gauge elements is lowered with the rise of the ambient temperature.

Conventionally, in order to compensate this thermal sensitivity shift, a resistor of suitable value was serially inserted between a bridge circuit and source, or a constant current source was employed as the source so that the voltage between the input terminals of the bridge circuit was increased with the rise of the ambient temperature because of the positive temperature characteristic of resistance of the semiconductor strain gauge elements, thereby to compensate the sensitivity shift. However, the thermal sensitivity compensating method described above was effective only in the case where the temperature coefficient of resistance of the semiconductor strain gauge elements was nearly equal to or larger than the temperature coefficient of the sensitivity of the bridge circuit, and this method could not be applied to other cases because the compensation was incomplete.

Another method of compensating for thermal sensitivity shift was to replace the resistor that was serially inserted between the bridge circuit and the source by a temperature-sensitive-heat responsive resistance element of the negative temperature characteristic type, such as a thermistor. However this method had such defects that it was necessary to adjust the nonlinearity of the resistance-temperature characteristics of the temperature-sensitive resistance element. Such an adjustment for optimizing the temperature compensation was complex and difficulties were involved in achieving close compensation and the like.

SUMMARY OF THE INVENTION

Accordingly, it is an object of the present invention to provide a new an improved unique and simple detecting circuit for accurately detecting a physical quantity.

It is another object of the present invention to provide a new and improved, unique and simple detecting circuit for compensating for the shift of the sensitivity of a uetecting circuit due to a temperature change between the base and emitter of a transistor means in proportion to a change of the tdmperature, and for generating between two output terminals of the detecting cirbuit ]n output voltage precisely in proportion to the physical quantity to be applied to a semiconductor sensitive element.

It is a wurther 6bject 6f the present invention to provide a new and improved unique and simple detecting circuit for accurately detecting a physical quantity which includes a biasing arrangement to thereby provide the additional advantage of omitting a second power supply means.

It a still further object of the present invention to provide a new and improved, unique and simple detecting circuit using an impedance converter means in order to supply an output voltage in proportion to an input current from the collector of a transistor means, thereby supplying a voltage signal in proportion to the change of the temperature of the input terminals of the detecting circuit.

Yet one other object of the present invention is to provide a new and improved unique and simple circuit which uses a feedback resistor having a predetermined resistance value connected to the collector and base of a transistor thereby increasing the accuracy of detecting a physical quantity by controlling the output current to the detecting means by adjusting the negative feedback impedance.

Briefly, in accordance with the present invention, the foregoing and other objects are attained by the provision of a physical quantity detecting circuit not having any of the defects described above in the description of the prior art.

According to the present invention in one aspect, a transistor is employed as a temperature-sensitive resistance element and is disposed at the same temperature as that of semiconductor strain gauge elements within a bridge circuit, and a current or voltage supplied to the bridge circuit is provided with positive temperature characteristics by utilizing the temperature characteristics of the transistor. The value and the temperature coefficient of the current or voltage supplied to the bridge circuit can be respectively adjusted independently of each other with two resistor means. According to the present invention, the optimum adjustment of the temperature compensation can be easily carried out with the simply constructed circuit, and in addition the value of current or voltage supplied to the bridge circuit can be set independently of the adjustment for the temperature compensation. Therefore, the adjustment of the sensitivity of the bridge circuit can be easily carried out without affecting the temperature characteristics of the sensitivity of the bridge circuits after temperature compensation has been made. Further, in the present invention, the temperature characteristics of the transistor which is disposed in the same temperature atmosphere as that of the semiconductor strain gauge elements is changed almost linearly and accordingly, the current or voltage supplied to the bridge circuit is linearly changed with the temperature change so that the compensating accuracy is very high. Furthermore, since the adjusting range of the temperature coefficient of the current or voltage is very wide, the temperature compensation can be carried out in almost all of the transducers in which the sensitivity of the bridge circuit has a negative temperature characteristic, and especially, it is very effective in the case wherein the temperature coefficient of the sensitivity of the bridge circuit is large.

According to another aspect of the present invention, a transistor is operated as a temperature sensitive element, and the transistor is disposed at the same ambient temperature as that of semiconductor strain gauge elements, and by means of utilizing the temperature characteristics of the transistor the current or voltage supplied to the bridge circuit is provided with a predetermined positive temperature characteristic, corresponding to the negative temperature characteristic of the gauge factor of the semiconductor strain gauge elements forming the bridge circuit and thus the sensitivity of the bridge circuit is made constant to the temperature change.

It will especially be noted that with the present invention, in still another aspect the current change of the collector of the transistor is negatively fed back toward the base side of the transistor, and its feedback amount is adjusted with a variable resistor, and the variation of the current or voltage supplied to the bridge circuit to the temperature change can be finely adjusted, and the sensitivities of the bridge circuit at two temperature points can be made to be entirely equal to each other with only time adjustment. Thus, the adjusment for the temperature compensation can be very easily carried out, and very accurate compensation can be achieved. In addition, the current or voltage supplied to the bridge circuit can be set nearly independently of the adjustment for the temperature compensation, and thus the adjustment of the sensitivity can be easily carried out without any influence to the temperature characteristics of the sensitivity after the temperature compensation.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DETAILED DESCRIPTION OF THE PREFERRED EMBODIMENTS

Figure 1:
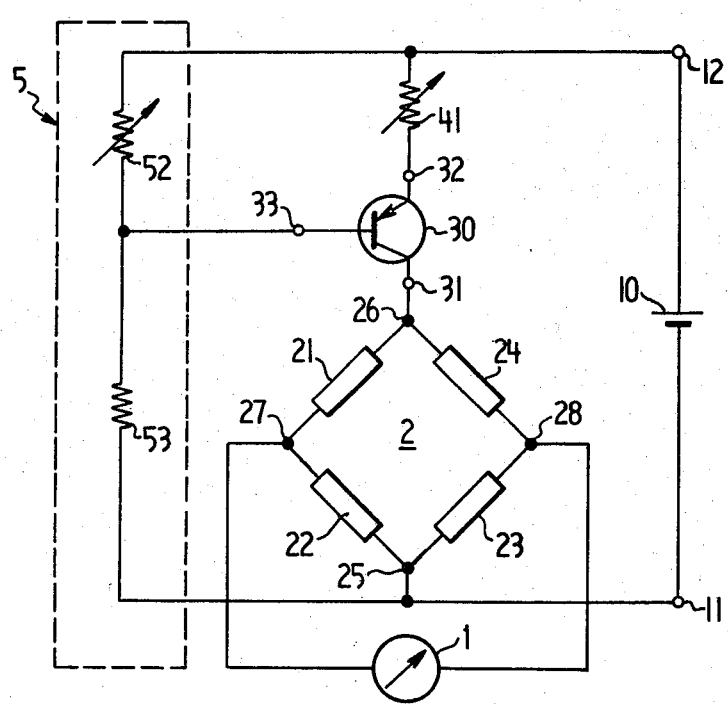
FIG. 1 shows a physical quantity detecting circuit of a first preferred embodiment of the present invention.

Before discussing in detail with reference to the drawings, the preferred embodiments of the present invention will it will useful to first discuss the various aspects to which the invention is directed.

The first aspect of the invention is a detecting circuit which includes at least one semiconductor sensitive element, two input terminals and two output terminals. The semiconductor sensitive element has a resistivity which is variable in proportion to a physical quantity to be applied thereto. First power supply means are connected to the two input terminals of the detecting circuit for applying a voltage thereacross and transistor means having an emitter, a base and a collector are connected to one input terminal of the detecting circuit, the transistor means being disposed at a portion adjacent to the semiconductor sensitive element of the detecting circuit. Second power supply means for applying a predetermined voltage is connected to the base of the transistor means, and first resistor means having a predetermined resistance value is connected to the first power supply means and the emitter of the transistor means, thereby compensating a shift of sensitivity of the detecting circuit due to a temperature change of the semiconductor sensitive element by the characteristics of the voltage change between the base and emitter of the transistor means in proportion to the temperature change and generating a precise output voltage between the two output terminals in proportion to the physical quantity to be applied to the semiconductor sensitive element.

The second aspect of the invention uses the first power supply means as the second power supply means and further has a biasing circuit which includes at least one resistor means having a predetermined resistance value of which two ends are connected to the first power supply means and a third end is connected to the base of the transistor means in the first aspect. The second aspect of the invention compensates the shift of the sensitivity of the detecting circuit and generates a precise output voltage in proportion to the physical quantity similarly to the first aspect and has the additional advantage of omitting the second power supply means.

The third aspect of the invention has a second resistor means having a predetermined resistance value of which one end is connected to one terminal of the first power supply means and the other end is connected to the base of the transistor means. Third resistor means is provided having a predetermined resistor value of which one end is connected to said base of the transistor means and the other end is connected to the other terminal of the first power supply means. In this third aspect, the bias voltage to the base of the transistor means is decided by the ratio of the resistance values of the second and third resistor means.

The fourth aspect of the invention adds to the second aspect of the invention an impedance converter means having at least one resistor means having a predetermined resistance value of which one end is connected to the collector of the transistor means and the other end is connected to the other terminal of the first power supply means in order to supply an output voltage in proportion to the input current from the collector of the transistor means. The fourth aspect supplies a voltage signal in proportion to the change of the temperature at the input terminals of the detecting circuit, compensates for the shift of the sensitivity of the output voltage of the detecting circuit due to a temperature change of the semiconductor sensitive element, and generates a precise output voltage in proportion to the physical quantity to be applied to the semiconductor sensitive element.

The fifth aspect of the invention adds, to the third aspect a seventh resistor means as a feedback resistor means having a predetermined resistance value of which both ends are connected to the collector and base of the transistor means in order to negatively feed back the output current from the collector of the transistor means to the base of the transistor means. The fifth aspect increases the accuracy of detecting the physical quantity by controlling output current to the detecting means. Such controlling is attained by adjusting the negative feedback impedance and thereby controlling the bias voltage to the base of the transistor means. The temperature characteristics of the output current from the transistor means to detecting circuit is designed by setting up the resistance values of the second and third resistor means and the sensitivity of the detecting means is further compensated by setting up the resistance value of the seventh resistor means as the feedback resistor means.

The third aspect of the invention whish is an improvement of the first and second aspects of the invention will now be described with reference to first and second preferred embodiments as explained with respect to FIGS. 1 to 3.

FIG. 1 shows the physical quantity detecting circuit of the first embodiment in which there is provided a bridge circuit 2 having four arms provided with semiconductor strain gauge elements 21 to 24, two opposed input terminals 25, 26, and two opposed output terminals 27, 28. An output indicator 1 is provided between the output terminals 27, 28, and shows an unbalanced voltage due to a resistance change of the strain gauge elements 21 to 24.

In this embodiment the bridge circuit 2 has a characteristic such that the temperature coefficient of the gauge factor of the strain gauge elements 21 to 24 is larger than the resistance-temperature coefficient thereof and the sensitivity of the bridge circuit 2 is lowered with a temperature rise, even if a constant current is supplied between the input terminals 25, 26.

The input terminal 25 of the bridge circuit 2 is connected to the minus (−) terminal 11 of a source 10, and the input terminal 26 is connected to the collector 31 of a transistor 30 which is disposed near the strain gauge elements 21 to 24 to make the ambient temperature thereof similar to that of the strain gauge elements. The emitter 32 of the transistor 30 is connected with the plus (+) terminal 12 of the source 10 through a first variable resistor 41. A second variable resistor 52 for supplying a variable D.C. bias voltage is connected between the base 33 of the transistor 30 and plus (+) terminal 12 of the source 10. A resistor 53 is connected between the base 33 of the transistor 30 and the minus (−) terminal 11 of the source 10, to thereby form a biasing circuit 5.

Now, the operation of the physical quantity detecting circuit of the first embodiment will be explained.

The transistor 30, the first variable resistor 41, the second variable resistor 52 and the resistor 53 constitute a constant current circuit. In this connection, it will be easily understood that the current value I which is supplied between the input terminals 25, 26 of the bridge circuit from the collector 31 of the transistor 30 can be nearly expressed as follows:

$$I = \frac{V - V_{BE}}{R_{41}}$$

where

V is the D.C. bias voltage supplied between the base 33 of the transistor 30 and the plus (+) terminal 12 of the source 10, $R_{41}$ is the resistance value of the first variable resistor 41, and $V_{BE}$ is the forward voltage of the emitter junction of the transistor 30

In general, the temperature characteristics of a silicon transistor is about −2mV/°C and that of a germanium transistor is about −1.8mV/°C. Therefore, the current I will vary with the temperature of the transistor 30; and the current temperature coefficient thereof can be set by the voltage value of the D.C. voltage V. The current I can thereby be set with the resistance value $R_{41}$ of the first variable resistor 41.

Figure 2:
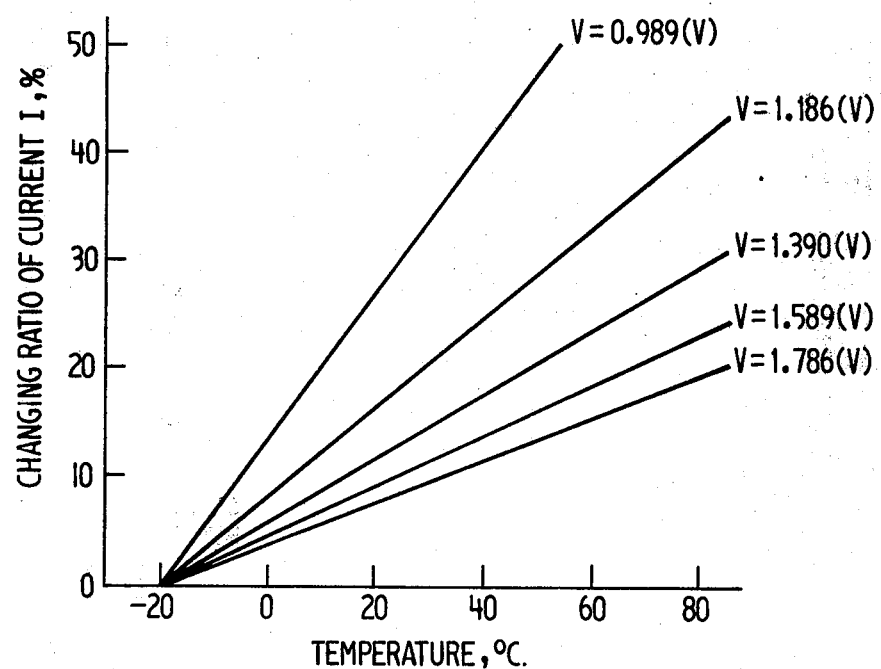
FIG. 2 shows the temperature characteristics of the current supplied to the bridge circuit in the case of the circuit of the first embodiment.

FIG. 2 shows experimental results of the current temperature characteristics of the current I, in which the (%) variation of the current I is plotted as an ordinate and the variation of the temperature (°C) is plotted as an abscissa, taking the D.C. bias voltage V as the parameter. In FIG. 2 it is clearly seen that the current I is increased with the rise of the temperature and such increase is more remarkable with a smaller D.C. bias voltage V. Thus, the ambient temperature of the transistor is made to that of the bridge circuit 2 composed of the semiconductor strain gauge elements 21 to 24, and the second variable resistor 52 is adjusted to obtain the optimum value of the D.C. bias voltage V so that the sensitivity of the bridge circuit is made independently of the temperature change. Also, the current I supplied to the bridge circuit 2 can be set by adjusting the first variable resistr 41 so that the sensitivity of the bridge circuit is of a predetermined value.

The physical quantity detecting circuit of the second embodiment will now be explained with respect to FIG. 3 and compared with the physical quantity detecting circuit of the first embodiment. The similar parts to those of the circuit of the first embodiment shown in FIG. 1 are given similar reference numerals and their detailed explanation will be omitted. In the second embodiment, the current supplied to the bridge circuit is stabilized by slightly changing the bias circuit 5. This is accomplished by supplying the D.C. bias voltage between the base 33 of the transistor 30 and the plus (+) terminal 12 of the source 10 in the circuit of the first embodiment shown in FIG. 1.

Figure 3:
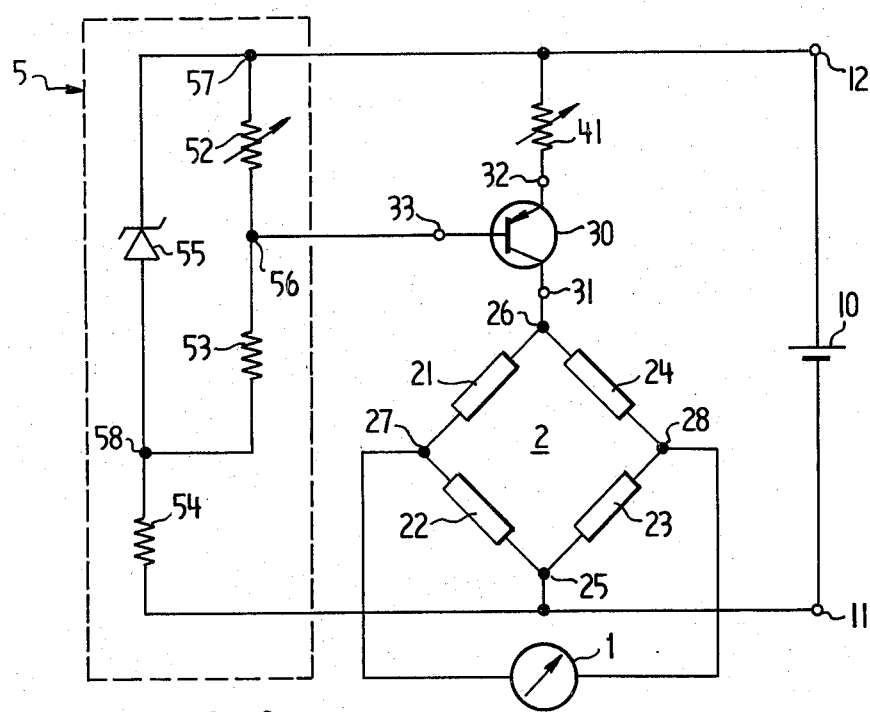
FIG. 3 shows a physical quantity detecting circuit of a second preferred embodiment of the present invention.

More particularly, in FIG. 3 a Zener diode 55 is disposed in parallel with the second variable resistor 52 and the resistor 43 in the physical quantity detecting circuit of the first embodiment, and the minus terminal of the Zener diode 55 is connected to a contact 57. The anode of the Zener diode 55 is connected to a contact 58. A resistor 54 is connected between the contact 58 and the minus (−) terminal 11 of the source 10. The remaining construction is similar to that of the circuit of the first embodiment.

The operation of the physical quantity detecting circuit of the second embodiment will now be explained. The source 10, the Zener diode 55 and the resistor 54 constitute a well-known constant voltage circuit. The constant voltage which is not affected by a voltage change at the source 10 can be obtained at both ends of the Zener diode 55. The D.C. bias voltage is obtained by dividing the constant voltage across the second variable resistor 52 and the resistor 53, and the value of the D.C. bias voltage can be set by adjusting the second variable resistor 52. Consequently, a stable D.C. bias voltage V which is not effected by a voltage change at the source 10 can be supplied between the base 33 of the transistor 30 and the plus (+) terminal 12 of the source 10.

The current I supplied to the bridge circuit 2 is stabilized by the stable D.C. bias voltage V whereby the sensitivity of the bridge circuit 2 is made to be stable. In the circuit of the second embodiment, the temperature is compensated by an adjustment of the second variable resistor 52 and the sensitivity of the bridge circuit 2 is set to be a determined value by an adjustment of the first variable resistor 41 as in the circuit of the first embodiment. Additionally the sensitivity is never changed even if the voltage of the source 10 is varied for any reason.

Further, in this embodiment, when a Zener diode having a relatively low Zener voltage and negative voltage-temperature characteristics is selected as the diode 55, and when the Zener diode 55 is disposed near the semiconductor strain gauge elements 21 to 24, as in the transistor 30, to make the ambient temperature of the Zener diode similar to that of the strain gauge elements, it is possible to provide slightly negative voltage-temperature characteristics with the D.C. bias voltage V, and consequently the temperature coefficient of the current I can be made small without making the D.C. bias voltage large. Accordingly, in the case where the temperature coefficient of the sensitivity of the bridge circuit 2 is relatively small before the temperature compensation, the D.C. bias voltage and the voltage of the source 10 must be made relatively large when the temperature compensation is made by using the circuit of the first embodiment shown in FIG. 1. However, the temperature compensation can be made without making the D.C. bias voltage V and the source voltage so large with the circuit of this embodiment.

Figure 4:
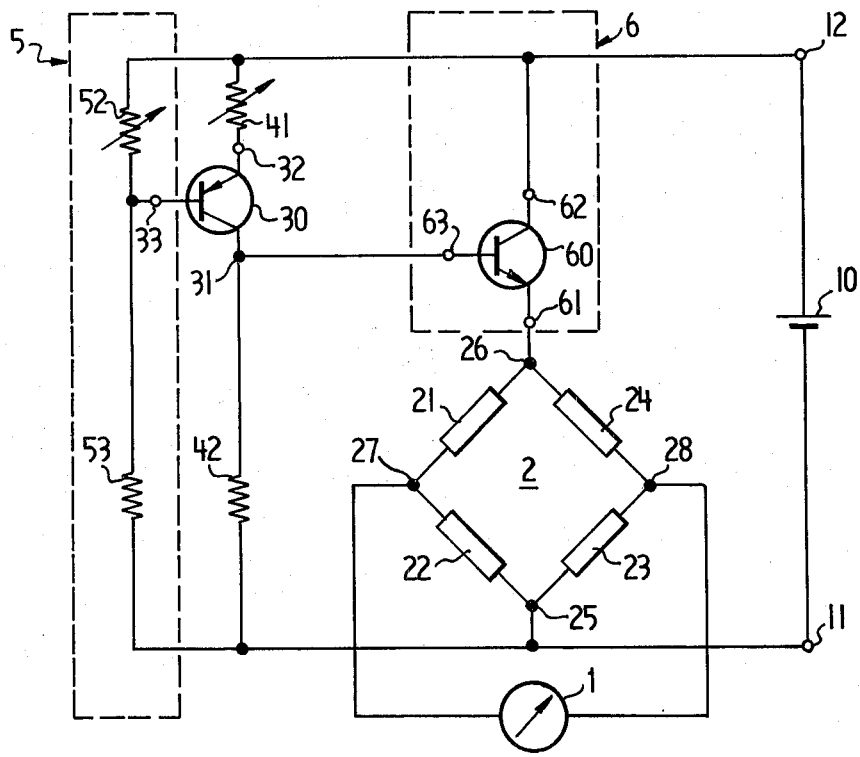
FIG. 4 shows a physical quantity detecting circuit of a third preferred embodiment of the present invention.
Figure 5:
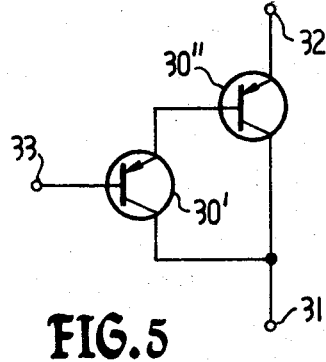
FIG. 5 shows a composite transistor as a modification of the transistor disposed near the semiconductor strain gauge elements in the previous embodiments.

One example of the fourth aspect of the present invention will now be described with respect to FIG. 4 wherein a third preferred embodiment of a physical quantity detecting circuit is shown. In the circuits of the first and second embodiments, the temperature compensation is carried out by providing predetermined positive temperature characteristics to the current supplied to the bridge circuit 2. However, in the circuit of the third embodiment, an impedance converter circuit is added so that a current change is converted to a voltage change, and the temperature compensation is carried out by providing predetermined positive temperature characteristics to the voltage supplied to the bridge circuit 2, and thus temperature compensation of the sensitivity shift are not affected by a resistance change of the semiconductor strain gauge elements due to a temperature change. This will be explained with comparison to the circuit of the first embodiment. The similar parts to those of the circuit of the first embodiment are denoted by the same reference numerals and their detailed explanation will be omitted.

In the circuit of the third embodiment, the emitter 32 of the transistor 30 disposed near the strain gauge elements 21 to 24 is connected to the plus (+) terminal 12 of the source 10 through the first variable resistor 41, and as in the circuit of the first embodiment, the D.C. bias voltage is supplied from the biasing circuit 5 composed of the resistor 53 and the second variable resistor 52 between the base 33 of the transistor 30 and the plus (+) terminal 12 of the source 10. The D.C. bias voltage can be variably set by adjusting the second variable resistor 52. The collector 31 of the transistor 30 is connected to the minus (−) terminal 11 of the source 10 through the resistor 42. The collector 31 is also connected to the base 63 of a transistor 60 forming an impedance converter circuit 6. The collector 62 of the transistor 60 is connected to the plus (+) terminal 12 of the source 10, and the emitter 61 is connected to the other input terminal 26 of the bridge circuit 2.

The operation of the physical quantity detecting circuit of the third embodiment with the above construction will now be explained. As in the first embodiment, the transistor 30, the first variable resistor 41, the second variable resistor 52 and the resistor 53 consitute the constant circuit. The current supplied to the resistor 42 from the collector 31 of the transistor 30 is linearly increased with a temperature rise, and the temperature coefficient can be arbitrarily set by adjusting the second variable resistor 52 to thereby adjust the D.C. bias voltage value supplied between the base 33 of the transistor 30 and the plus (+) terminal 12 of the source 10. The value of the current supplied to the resistor 42 can be arbitrarily set by adjusting the first variable resistor 41. Further, the current is converted to a voltage with the resistor 42, and the voltage is supplied to the base 63 of the transistor 60. The transistor 60 is operated as an emitter-follower, having high input impedance and low output impedance characteristics. The voltage following the change of the voltage supplied to the base 63 is supplied to the input terminal 26 of the bridge circuit 2 from the emitter 61. The value of this voltage is varied little even if the resistance of the semiconductor strain gauge elements 21 and 24 is changed. The temperature compensation is carried out by disposing the transistor 30 at the same ambient temperature as that of the bridge circuit 2 which is composed of the semiconductor strain gauge elements 21 to 24 and adjusting the second variable resistor 52 to obtain a predetermined value of D.C. bias voltage so that the sensitivity of the bridge circuit 2 is made constant independently of the temperature change.

Further, the voltage supplied to the bridge circuit 2 can be set by adjusting the first variable resistor 41 so that the sensitivity of the bridge circuit, is made of a predetermined value. The temperature compensation of the first and second embodiments can be carried out only under the condition that the temperature coefficient of the gauge factor of the semiconductor strain gauge elements is larger than the resistance-temperature coefficient thereof, and the sensitivity of the bridge circuit 2 is lowered with a temperature rise, even if a constant current (not varying with temperature) is supplied to the bridge circuit. However, since the circuit of this embodiment is not influenced by a resistance change of the semiconductor strain gauge elements and therefore the temperature coefficient of the gauge factor of the semiconductor strain gauge elements is negative, the temperature compensation can be effectively carried out in almost all semiconductor transducers in which the sensitivity is lowered with a temperature rise under the condition that a constant voltage is supplied to the bridge circuit 2.

In this embodiment, the sensitivity of the bridge circuit 2 is adjusted by adjusting the first variable resistor 41 which determines the current value through the resistor 42 and also determines the voltage value supplied to the bridge circuit 2. However the value of the voltage supplied to the bridge circuit 2 and the sensitivity of the bridge circuit 2 may be adjusted by replacing the variable resistor 41 with a fixed resistor having a predetermined value and a fixed resistor 42 with a variable resistor and by adjusting such variable resistor 42.

Further, in this embodiment, the transistor 60 is employed as an emitter-follower for the impedance converter circuit 6 but, by use of another example, a field-effect transistor can be employed as a source-follower.

Also, in this embodiment, the biasing circuit 5 composed of the second variable resistor 52 and the resistor 53 may be replaced with a biasing circuit composed of the second variable resistor 52, the resistors 53, 54 and the Zener diode 55 as in the second embodiment. In accordance therewith, the feature of not being affected by a voltage change of the source will be added to the features of the circuit of this embodiment.

The fifth aspect of the invention will now be described with respect to FIGS. 6 and 7 wherein a fourth and fifth preferred embodiment of a physical quantity detecting circuit is shown.

Figure 6:
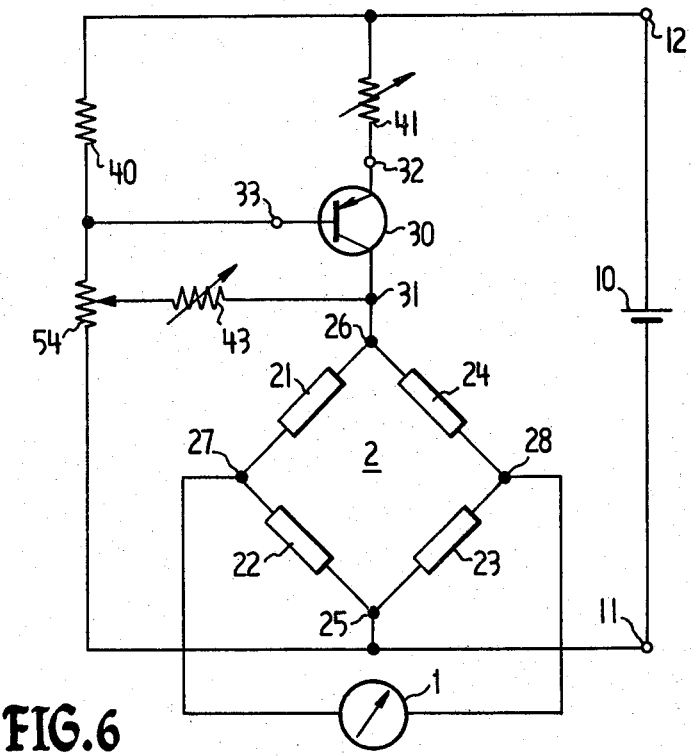
FIG. 6 shows a physical quantity detecting circuit of a fourth preferred embodiment of the present invention.
Figure 7:
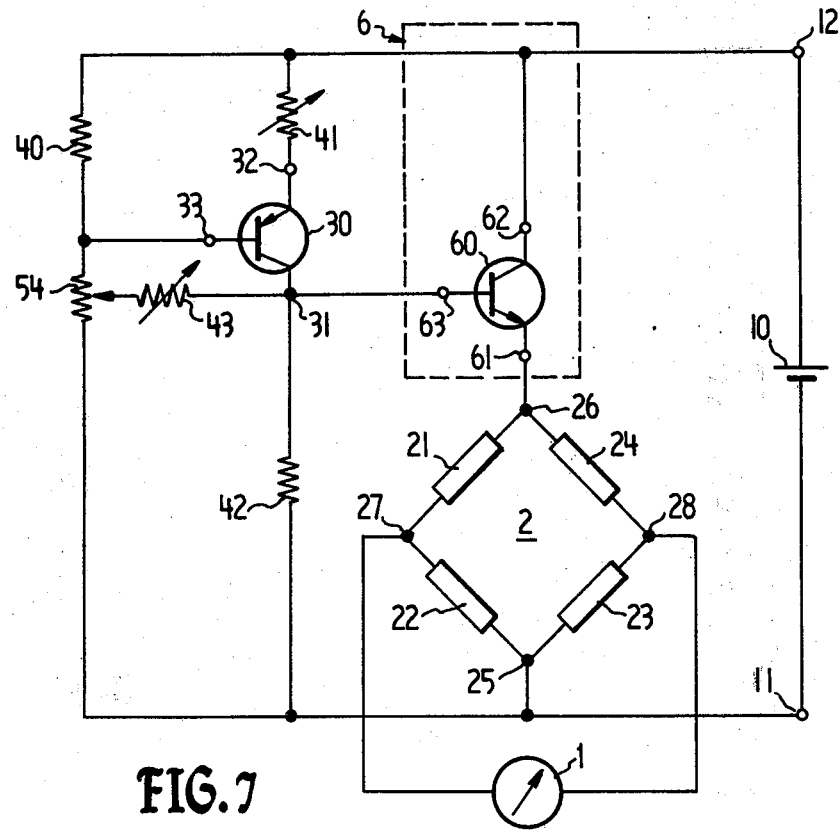
FIG. 7 shows a physical quantity detecting circuit of a fifth preferred embodiment of the present invention.

FIG. 6 shows the physical quantity detecting circuit of the fourth embodiment, with the bridge circuit 2, the semiconductor strain gauge elements 21 to 24 disposed at the four arms, one opposite pair of terminals 25, 26 used as the input terminals, and the other pair of terminals 27, 28 used as the output terminals. Between the output terminals 27, 28, there is connected an output indicator 1 by which the unbalanced voltage based on a resistance change of the strain gauge elements 21 to 24 is indicated.

In this embodiment the characteristics of the bridge circuit 2 is such that the strain gauge elements 21 to 24 have positive resistance-temperature characteristics, and the output sensitivity obtained between the output terminals of the bridge circuit 2 shows positive or negative temperature characteristics under the condition wherein a constant current is supplied between the input terminals 25, 26 because the temperature characteristics of the gauge factor of the strain gauge element, the thermal stress acting on the strain gauge elements and so on.

One input terminal 25 of the bridge circuit 2 is connected to the minus (−) terminal 11 of the source 10, and the other input terminal 26 is connected to the collector 31 of the transistor 30 disposed near the strain gauge elements 21 to 24 so that they are under the same temperature condition. The emitter 32 of the transistor 30 is connected to the plus (+) terminal 12 of the source 10 through the first variable resistor 41. The base 33 is connected to the plus (+) terminal 12 of the source 10 through the resistor 40 and the second variable resistor 54 is connected between the base 33 and the minus (−) terminal 11 of the source 10. The third variable resistor 54 and the other input terminal 26 of the bridge circuit 2. The value of the resistor 40 and that of the second variable resistor 54 are suitably selected so that when the value of the third variable 43 is made maximum or the resistor is disconnected, the value of the voltage supplied between the base 33 of the transistor 30 and the plus (+) terminal 12 of the source 10 can be set to slightly increase the sensitivity of the bridge circuit 2 with a temperature rise.

The circuit of the fourth embodiment having a construction as described above is adjusted beforehand as follows so that the sensitivities of the bridge circuit are equal to each other at two temperature points $T_1$ and $T_2$ ($T_1 < T_2$). (1) At the lower temperature $T_1$, the current I supplied to the bridge circuit is set by adjusting the first variable resistor 41 so that the sensitivity of the bridge circuitt 2 is made to be of a predetermined value under the condition that the value of the third variable resistor 43 is set to be maximum or one terminal of the resistor is disconnected. (2) At the lower temperature $T_1$, under the condition that the third variable resistor 43 is set to be maximum or one terminal of the resistor 43 is disconnected. The voltage of the control terminal of the second variable resistor 43 relative to the minus (−) terminal 11 of the source 10 is made equal to that of the collector 31 of the transistor 30 relative to the same point by adjusting the second variable resistor 42. In carrying out the adjustments (1) and (2) with the third variable resistor being connected, the sensitivity of the bridge circuit set by the adjustment (1) may be occasionally varied by the adjustment (2), in which case it will be necessary to carry out the adjustment (1) and (2) repeatedly). (3) At the higher temperature $T_2$, the third variable resistor 43 is connected, and the value of the third variable resistor 43 is adjusted so that the sensitivity of the bridge circuit is made equal to the sensitivity set by the adjustment (1).

The operation of the circuit of the fourth embodiment will now be explained. After the adjustment (1), the current which is adjusted in order to provide the bridge circuit with a predetermined value of sensitivity by adjusting the value of the first variable resistor 41 is supplied to the input terminal 26 of the bridge circuit 2. After the adjustment (2), at the lower temperature $T_1$, the voltage at the control terminal of the second variable resistor 42 is set to be equal to that of the input terminal 26, so that the current is not supplied to the third variable resistor 43, even if the variable resistor 43 is connected, and set to any resistance value. Therefore, the current I supplied to the bridge circuit 2 is not changed and the predetermined sensitivity is kept. At the higher temperature $T_2$, the voltage at the input terminal 26 of the bridge circuit 2 relative to the minus (−) terminal 11 of the source 10 is then increased by selecting the value of the resistor 40 and that of the second variable resistor 54 in order to supply the D.C. bias voltage V between the base 33 of the transistor 30 and the plus (+) terminal 12 of the source 10 so that the sensitivity of the bridge circuit 2 increased a little more than that at the lower temperature $T_1$, because of the temperature characteristics of the transistor 30. However by adding and connecting the third variable resistor 43, the increased voltage is negatively fed back to the base side of the transistor 30 through the third variable resistor 43 to decrease the D.C. bias voltage V, and then the current I supplied to the bridge circuit 2 is decreased.

When the value of the third variable resistor 43 is smaller, then the decrement of the current I is more remarkable, and therefore, the sensitivity of the bridge circuit 2 can be made equal to the predetermined sensitivity at the temperature $T_1$ by adjusting the third variable resistor 43. It is apparent from the explanation above that the predetermined sensitivity can be obtained again regardless of the adjusted value of the third variable resistor 43 when the temperature is again lowered to $T_1$.

Thus, in this embodiment, the adjustment for temperature is carried out by changing only one time the temperature of the bridge circuit 2 composed of the semiconductor strain gauge elements 21 to 24 and adjusting variable resistors, whereby the sensitivities of the bridge circuit at the two different temperature points can be made entirely equal to each other. In addition, the current supplied to the bridge circuit is linearly changed with the temperature change. Accordingly, a temperature compensation with very high accuracy can be carried out by a simple adjustment.

In this embodiment, negative feedback is provided to the transistor 30 by means of the third variable resistor 43, so that the current supplied to the bridge circuit 2 can be decreased with the temperature rise in case that the resistance temperature characteristics of the semiconductor strain gauge elements 21 to 24 show a positive temperature coefficient. Thus, the compensation can be effectively carried out in the bridge circuit 2 and an over compensation is made in the case wherein the resistance temperature coefficient of the semiconductor strain gauge elements is large and the constant current is supplied to the bridge circuit 2. Thus, the circuit of this embodiment is widely applicable.

In the embodiment described above the adjustment for the temperature compensation of the sensitivity shift due to the temperature change, and the adjustment for the sensitivity itself are carried out at the same time. After these adjustments readjustment may be made by means of the first variable resistor 41 in order to obtain a sensitivity value different from the above value and the changing ratio of the current supplied to the bridge circuit 2 will only barely affect the temperature, and also only barely affect the temperature compensation effect. Thus, according to the circuit of this embodiment, the output sensitivity can be adjusted without lowering the characteristics after the temperature compensation is once carried out.

A second example of the fifth aspect based on the temperature compensation circuit of a fifth embodiment will be explained with respec to FIG. 7. In the circuit of the fourth embodiment, the temperature compensation is made by optimizing the temperature characteristics of the current supplied to the bridge circuit 2, but according to the circuit of the fifth embodiment, the impedance converter circuit of the impedance converter means is added to convert the current change to a voltage change, and the temperature compensation is carried out by optimizing the temperature characteristics of the voltage supplied to the bridge circuit 2 without being affected by the resistance change of the semiconductor strain gauge elements due to the temperature change. In the following explanation the same parts as those of the circuit of the fourth embodiment are shown with the same reference numerals, and the detailed explanation as to the same parts will be omitted.

In the circuit of the fifth embodiment, the emitter 32 of the transistor 30 disposed near the strain gauge elements 21 to 24 is connected to the plus (+) terminal 12 of the source 10 through the first variable resistor 41; the collector 31 of the transistor 30 is connected to the minus (−) terminal 11 of the source 10 through the resistor 42; the base 33 is connected to the plus (+) terminal 12 of the source 10 through the resistor 40; the second variable resistor 42 is connected betweeen the base 33 and the minus (−) terminal 11 of the source; and the third variable resistor 43 is connected between the control terminal of the second variable resistor 54 and the collector 31 of the transistor 30. The collector 31 of the transistor 30 is connected to the base 63 of the transistor 60 which forms the impedance converter circuit 6; the collector 62 of the transistor 60 is connected to the plus (+) terminal 12 of the source 10; and the emitter 61 is connected to the input terminal 26 of the bridge circuit 2.

In this case, the value of the resistor 40 and that of the second variable resistor 54 are selected so as to obtain the bias voltage V supplied between the base 33 of the transistor 30 and the plus (+) terminal 12 of the source, in proportion to which the current supplied to the resistor 42 is increased as the temperature rises, and then the input voltage to the impedance converter circuit 6 is increased. Then the output voltage, namely, the voltage supplied to the bridge circuit 2 is increased, bridge circuit 2 is slightly increased under the condition that the value of the third variable resistor is made to be maximum, or the resistor is disconnected.

Before using the circuit of the fifth embodiment, the complete adjustment for the temperature compensation is carried out so that the sensitivities of the bridge circuit 2 are made to be equal to each other at the two temperature points $T_1$ and $T_2$ in the same manner as described above in the fourth embodiment.

The operation of the temperature compensation circuit of the fifth embodiment will now be explained. The constant current circuit composed of the transistor 30, the first and second variable resistors 41, 54, and the resistor 40 is the same as that of the circuit of the fourth embodiment. The current supplied to the resistor 42 from the collector 31 of the transistor 30 is almost linearly increased as the temperature rises, and the temperature coefficient is predetermined by the D.C. bias voltage V supplied between the base 33 of the transistor 30 and the plus (+) terminal 12 of the source. The current itself can also be suitably set by adjustment of the first variable resistor 41. Moreover, the current is converted to a voltage by the resistor 54, and the voltage is supplied to the base 63 of the transistor 60. The transistor 60 is operated as an emitter-follower with both a high input impedance and low output impedance, and the voltage following the change of the voltage supplied to the base 63 is supplied to the input terminal 26 of the bridge circuit 2 from the emitter 61, and the voltage is varied only slightly even if the resistance values of the semiconductor strain gauge elements 21 to 24 are varied.

Therefore, at the lower temperature $T_1$, after the adjustment (1), the voltage predetermined by the value of the first variable resistor 41 is supplied to the bridge circuit so that the predetermined sensitivity of the bridge circuit can be obtained. At the higher temperature $T_2$, because of the temperature characteristics of the transistor 30, the voltage of the collector 31 of the transistor 30 relative to the minus (−) terminal 11 of the source 10 is then increased in proportion to the D.C. bias voltage V supplied between the base 33 of the transistor 30 and the plus (+) terminal 12 of the source 10, and the sensitivity of the bridge circuit 2 is increased. However the voltage of the collector 31 is negatively fed back to the base 33 by adding and connecting the third variable resistor 43, and then, the sensitivity of the bridge circuit 2 can be made to be equal to the predetermined value at the temperature $T_1$ by adjusting the third variable resistor 43. As in the case of the circuit of the fourth embodiment even if the temperature is again made to be $T_1$, the predetermined sensitivity obtained by the adjustment (2), is not varied.

In this embodiment the sensitivities of the bridge circuit 2 at the two temperature points are made to be entirely equal to each other by the adjustment at the two temperature points by only one changing of the temperature change, and the voltage supplied to the bridge circuit 2 is linearly varied relative to the temperature change. Consequently, temperature compensation with a very high accuracy can be made by a simple adjustment.

Moreover, in this embodiment, the voltage to the bridge circuit 2 is supplied from the impedance converter circuit 6 with low output impedance characteristics, and thus it is not affected by the resistance change of the semiconductor strain gauge elements 21 to 24. Therefore, accurate temperature compensation can be realized in a wide temperature range with the circuit of this embodiment. In the fourth embodiment, even if the temperature compensation is carried out so that the output sensitivities at the two temperature points are made to be entirely equal to each other, the compensation accuracy may be somewhat lowered at the medium temperature points because of the non-linearlity of the resistance-temperature characteristics of the semiconductor strain gauge elements 21 to 24, but in this fifth embodiment the accurate temperature compensation can be made in a wide temperature range.

Further, in this embodiment, one terminal of the third variable resistor 43 is connected to the collector 31 of the transistor 30 so that the change of the current supplied to the resistor 42 is negatively fed back to the base side of the transistor 30. But, in another embodiment, the terminal of the resistor 43 may be connected with the other input terminal 26 of the bridge circuit 2 so that the change of the input voltage of the bridge circuit 2 is negatively fed back. In this construction, an operation entirely equal to that of the fifth embodiment can be carried out. This is apparent from the fact that the change of the current supplied to the resistor 51 is transmitted to the change of the input voltage of the bridge circuit 2 through the impedance converter circuit 6.

The first, second and third variable resistors 41, 54 and 43 in the above embodiments may be respectively replaced by fixed resistors having the same values as those of the variable resistors after the adjustment for the temperature compensation.

One example of the third aspect of the invention based on the physical quantity detecting circuits of the first and second embodiments and one example of the fourth aspect of the invention based on the physical quantity detecting circuit of the third embodiment were explained above in detail, but the present invention is not limited to these circuits of the embodiments.

For example, it is not always necessary that the bridge circuit 2 be composed of four semiconductor strain gauge elements as in the circuits of the embodiments described above, but the bridge circuit may be composed of one or two semiconductor strain gauge elements and resistors.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A circuit for detecting a physical quantity, comprising:
   a detecting circuit including at least one semiconductor sensitive element, two input terminals and two output terminals, said semiconductor sensitive element having a resistivity which is variable in proportion to temperature and to the magnitude of a physical quantity to be applied thereto,
   power supply means having two output terminals,
   transistor means having an emitter, a base and a collector conected to one input terminal of said detecting circuit, said transistor means having predetermined temperature characteristics and being disposed adjacent to said semiconductor sensitive element of said detecting circuit so as to be subjected to the same ambient temperature,
   means for applying a predetermined voltage connected to said base of said transistor means, and
   first resistor means having a predetermined resistance value connected to one terminal of said power supply means and said emitter of said transistor means,
   thereby compensating a shift of sensitivity of said detecting circuit due to a temperature change of said at least one semiconductor sensitive element by the characteristics of the voltage change between the base and emitter of said transistor means in proportion to the change of the ambient temperature, and generating between said two output terminals an output voltage precisely in proportion to the magnitude of the physical quantity to be applied to said semiconductor sensitive element.

2. A circuit for detecting a physical quantity according to claim 1, wherein
   said means for applying a predetermined voltage comprises
   a biasing circuit having three terminals including at least one resistor means having a predetermined resistance value, first and second terminals of said biasing circuit being connected to said power supply means and the third terminal of said biasing circuit being connected to said base of said transistor means.

3. A circuit for detecting a physical quantity according to claim 2, further comprising
   impedance converter means having at least one fourth resistor means having a predetermined resistance value of which one end is connected to said collector of said transistor means and the other end is connected to the other terminal of said power supply means, thereby supplying an output voltage in proportion to the input current from the collector of said transistor means.

4. A circuit for detecting a physical quantity according to claim 2, wherein said biasing circuit comprises
   second resistor means having a predetermined resistance value of which one end is connected to said one terminal of said power supply means and the other end is connected to said base of said transistor means, and
   third resistor means having a predetermined resistance value of which one end is connected to said base of said transistor means and the other end is connected to the other terminal of said power supply means.

5. A circuit for detecting a physical quantity according to claim 4, wherein
   said third resistor means of said biasing circuit comprises fifth resistor means having a predetermined resistance value of which one end is connected to said base of said transistor means, sixth resistor means having a predetermined resistance value of which one end is connected to the other of said fifth resistor means and the other end is connected to the other terminal of said power supply means, and Zener diode means provided in parallel to said second and fifth resistor means of which a minus terminal is connected to said one terminal of said power supply means and and plus terminal is connected to a point between said fifth and sixth resistor means.

6. A circuit for detecting a physical quantity according to claim 4, further comprising:

impedance converter means having at least one fourth resistor means having a predetermined resistance value of which one end is connected to said collector of said transistor means and the other end is connected to the other terminal of said power supply means, thereby supplying an output voltage in proportion to the input current from the collector of said transistor means.

7. A circuit for detecting a physical quantity according to claim 6, wherein said impedance converter means comprises a fourth resistor as said fourth resistor means having a predetermined resistance value of which one end is connected to said collector of said transistor means and the other end is connected to the other terminal of said power supply means, thereby supplying an output voltage, and an impedance converter circuit having a low output impedance characteristic and connected to said collector of said transistor means, said one terminal of said power supply means and said one input terminal of said detecting circuit, thereby supplying the output voltage in proportion to the input voltage from said fourth resistor.

8. A circuit for detecting a physical quantity according to claim 4, wherein said transistor means comprises a composite-transistor such as a Darlington circuit including two transistors.

9. A circuit for detecting a physical quantity according to claim 4, further comprising seventh resistor means having a predetermined resistance value of which the two ends are respectively connected to said collector and said base of said transistor means, in order to negatively feed back the output voltage of said collector of said transistor means to said base of said transistor means.

10. A circuit for detecting a physical quantity according to claim 9, wherein said third resistor means of said biasing circuit is a variable resistor means having a control terminal, and said seventh resistor means is connected to said collector of said transistor means and the control terminal of said third resistor means, in order to negatively feed back the output voltage of said collector of said transistor means through said third resistor means to said base of said transistor means.

11. A circuit for detecting a physical quantity according to claim 10, further comprising:

impedance converter means having at least one fourth resistor means having a predetermined resistance value of which one end is connected to said collector of said transistor means and the other end is connected to the other terminal of said power supply means, thereby supplying an output voltage in proportion to the input current from the collector of said transistor means.

12. A circuit for detecting a physical quantity according to claim 11, wherein said impedance converter means comprises a fourth resistor as said fourth resistor means having a predetermined resistance value of which one end is connected to said collector of said transistor means and the other end is connected to the other terminal of said power supply means, thereby supplying an output voltage, and an impedance converter circuit having a low output impedance characteristic and connected to said collector of said transistor means, said one terminal of said power supply means and said one input terminal of said detecting circuit, thereby supplying the output voltage in proportion to the input voltage from said fourth resistor.

13. A circuit for detecting a physical quantity according to claim 10, wherein said transistor means comprises a composite-transistor such as a Darlington circuit including two transistors.

14. A circuit for detecting a physical quantity according to claim 4, wherein said detecting circuit comprises a Wheatstone bridge circuit having four semiconductor strain gauge elements on four arms thereof, said transistor means comprises a first transistor of which the collector is connected to one input terminal of said Wheatstone bridge circuit, said first resistor means comprises a first variable resitor of which one end is connected to the plus terminal of a source as said power supply means and the other end is connected to the emitter of said transistor, said second resistor means of said biasing circuit comprises a second variable resistor of which one end is connected to the plus terminal of said source and the other terminal is connected to the base of said first transistor, and said third resistor means of said biasing circuit comprises a third resistor having a predetermined resistance value of which one end is connected to the base of said first transistor and the other end is connected to the minus terminal of said source.

15. A circuit for detecting a physical quantity according to claim 14, wherein said third resistor means of said biasing circuit comprises fifth and sixth resistors which are connected in series and are connected to the base of said first transistor and the minus terminal of said source, and further comprising a Zener diode which is connected to said plus terminal of said source and a connecting point between said fifth and sixth resistors.

16. A circuit for detecting a physical quantity according to claim 14, further comprising:

impedance converter means comprising a fourth resistor as said fourth resistor means having a predetermined resistance value of which one end is connected to said collector of said first transistor and the other end is connected to the minus terminal of said source, thereby supplying an output voltage, and an impedance converter circuit comprising an emitter-follower transistor of which the base is connected to said collector of said first transistor and said fourth resistor, the collector is connected to said plus terminal of said source, and the emitter is connected to the one input terminal of said bridge circuit.

17. A circuit for detecting a physical quantity according to claim 14, further comprising
a second transistor of which the base is connected to said emitter of said first transistor, the emitter is connected to said first variable resistor, and the collector is connected to said collector of said first transistor and said one input terminal of said bridge circuit, so that said first transistor and said second transistor form a Darlington circuit.

18. A circuit for detecting a physical quantity according to claim 14, wherein
said third resistor means comprises a variable resistor having a control terminal and further comprising
seventh resistor means being a variable resistor having a predetermined resistance value of which one end is connected to said collector of said first transistor and the other end is connected to said control terminal of said third resistor.

19. A circuit for detecting a physical quantity according to claim 18, further comprising
impedance converter means comprising
a fourth resistor as said fourth resistor means having a predetermined resistance value of which one end is connected to said collector of said first transistor and the other end is connected to the minus terminal of said source, thereby supplying a output voltage, and
an impedance converter circuit comprising an emitter-follower transistor of which the base is connected to said collector of said first transistor and said fourth resistor, the collector is connected to said plus terminal of said source, and the emitter is connected to the one input terminal of said bridge circuit.

20. A circuit for detecting a physical quantity according to claim 18, further comprising
a second transistor of which the base is connected to said emitter of said first transistor, the emitter is connected to said first variable resistor, and the collector is connected to said collector of said first transistor and said one input terminal of said bridge circuit, so that said first and second transistors forms a Darlington circuit.

21. A circuit for detecting a physical quantity according to claim 1, wherein said means for applying a predetermined voltage comprises a second power supply means.

* * * * *